United States Patent
Yamada

(10) Patent No.: US 11,970,205 B2
(45) Date of Patent: Apr. 30, 2024

(54) STEERING COLUMN DEVICE

(71) Applicant: NSK LTD., Tokyo (JP)

(72) Inventor: Tatsuhiko Yamada, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 18/034,945

(22) PCT Filed: Dec. 8, 2021

(86) PCT No.: PCT/JP2021/045068
§ 371 (c)(1),
(2) Date: May 2, 2023

(87) PCT Pub. No.: WO2022/138158
PCT Pub. Date: Jun. 30, 2022

(65) Prior Publication Data

US 2023/0406396 A1    Dec. 21, 2023

(30) Foreign Application Priority Data

Dec. 24, 2020  (JP) ................................. 2020-214931

(51) Int. Cl.
*B62D 1/189*  (2006.01)
*B62D 1/184*  (2006.01)

(52) U.S. Cl.
CPC .............. *B62D 1/189* (2013.01); *B62D 1/184* (2013.01)

(58) Field of Classification Search
CPC ................................ B62D 1/184; B62D 1/189
See application file for complete search history.

(56) References Cited

U.S. PATENT DOCUMENTS

| 7,775,137 B2* | 8/2010 | Arbanas ................ B62D 1/184 280/775 |
| 11,279,394 B2* | 3/2022 | Pitzer ..................... B62D 1/184 |
| 2004/0155448 A1* | 8/2004 | Klukowski ............ B62D 1/195 280/777 |

(Continued)

FOREIGN PATENT DOCUMENTS

| CN | 104627230 A | 5/2015 |
| CN | 215553510 U | * 1/2022 |
| CN | 115432054 A | * 12/2022 |

(Continued)

OTHER PUBLICATIONS

International Search Report of PCT/JP2021/045068 dated Feb. 22, 2022 [PCT/ISA/210].

*Primary Examiner* — Nicole T Verley
(74) *Attorney, Agent, or Firm* — Sughrue Mion, PLLC

(57) ABSTRACT

A steering column device includes a friction plate having a long hole though which an adjusting rod is inserted and a mounting hole, and sandwiched at least one of a portion between one of inner-side surfaces of a pair of support plate portions and an outer-side surface of a column-side bracket of a steering column, and a portion between one of outer-side surfaces of the pair of support plate portions and one of inner-side surfaces of a pair of pressing portions. The steering column device includes a hook portion having a cantilever beam structure that is inserted through the mounting hole in the width direction, and the hook portion has a restricting projection for restricting movement in the width direction of the friction plate.

8 Claims, 17 Drawing Sheets

(56) References Cited

U.S. PATENT DOCUMENTS

2018/0079441 A1\* 3/2018 McKinzie .............. B62D 1/181
2020/0031383 A1\* 1/2020 Ponikiewski .......... B62D 1/184

FOREIGN PATENT DOCUMENTS

| EP | 2487088 A1 | \* | 8/2012 | ............ B62D 1/183 |
|----|------------|---|--------|-------------------------|
| EP | 2660124 A1 | \* | 11/2013 | ............ B62D 1/183 |
| EP | 2910450 A1 | \* | 8/2015 | ............ B62D 1/184 |
| EP | 3075628 A1 | \* | 10/2016 | ............ B62D 1/184 |
| EP | 3085602 A1 | \* | 10/2016 | ............ B62D 1/184 |
| FR | 3103449 A3 | \* | 5/2021 | ............ B62D 1/181 |
| JP | 2009029223 A | \* | 2/2009 | |
| JP | 2011-148487 A | | 8/2011 | |
| JP | 2011148487 A | \* | 8/2011 | |
| JP | 2016137734 A | \* | 8/2016 | |
| JP | 2019-182358 A | | 10/2019 | |
| JP | 2022162769 A | \* | 10/2022 | |
| SE | 1450613 A1 | \* | 11/2015 | |
| WO | WO-2016114034 A1 | \* | 7/2016 | ............ B62D 1/184 |
| WO | WO-2018209183 A1 | \* | 11/2018 | ............ B62D 1/184 |
| WO | 2020/085411 A1 | | 4/2020 | |
| WO | 2020/101018 A1 | | 5/2020 | |
| WO | WO-2020101018 A1 | \* | 5/2020 | ............ B62D 1/184 |
| WO | WO-2022138158 A1 | \* | 6/2022 | ............ B62D 1/184 |

\* cited by examiner

FIG. 7A                                    FIG. 7C

STEERING COLUMN DEVICE

CROSS REFERENCE TO RELATED APPLICATIONS

This application is a National Stage of International Application No. PCT/JP2021/045068 filed on Dec. 8, 2021, claiming priority based on Japanese Patent Application No. 2020-214931 filed on Dec. 24, 2020.

TECHNICAL FIELD

The present invention relates to a steering column device.

BACKGROUND OF INVENTION

A steering device for an automobile incorporates a steering wheel position adjusting device capable of adjusting an up-down position and a front-rear position of a steering wheel according to the physique and driving posture of a driver.

FIG. 14 to FIG. 16 illustrate an example of a steering device provided with a steering wheel position adjusting device as disclosed in JP 2011-148487 A.

The steering shaft 100 is rotatably supported at an inner side of a steering column 101. A steering wheel is fixed to a rear end portion of the steering shaft 100. The steering shaft 100, in order to allow adjustment of a front-rear position of the steering wheel, has a structure in which an inner shaft 102 arranged in the front and an outer shaft 103 arranged in the rear are combined by a spline engagement or the like in such a manner as to be capable of transmitting torque and capable of being expanded or contracted. Note that a front-rear direction means a front-rear direction of a vehicle, an up-down direction means an up-down direction of the vehicle, and a width direction means a width direction of the vehicle.

The steering column 101 has a substantially cylindrical shape and is supported by the vehicle body. The steering column 101, in order to allow adjustment of the front-rear position of the steering wheel, is configured such that an entire length thereof is capable of being expanded or contracted by loosely fitting a front-side portion of an outer column 105 arranged at the rear to a rear-side portion of an inner column 104 arranged at the front so as to allow relative displacement in an axial direction.

A column-side bracket 107 composed of a pair of sandwiched plate portions 106 is provided at the front-side portion of the outer column 105. The column-side bracket 107 is sandwiched from both sides in the width direction by a pair of support plate portions 109 provided on a vehicle-body-side bracket 108 supported by the vehicle body. An adjusting rod 112 is inserted in the width direction through column-side through holes 110 penetrating in the width direction through each of the pair of sandwiched plate portions 106, and vehicle-body-side through holes 111 penetrating in the width direction through each of the pair of support plate portions 109. In the conventional structure described in JP 2011-148487A, in order to enable adjustment of the front-rear position of the steering wheel, the column-side through holes 110 are configured as long holes extending in the front-rear direction. In addition, in order to enable adjustment of the up-down position of the steering wheel, the vehicle-body-side through holes 111 are configured as long holes extending in the up-down direction.

An anchor portion (head portion) 113 is provided at a base-end portion of the adjusting rod 112, and a retaining member 114 is attached to a tip-end portion of the adjusting rod 112. A cam device 115 and an adjusting lever 116 are provided between the anchor portion 113 and the support plate portion 109 on one side in the width direction (left side in FIG. 16).

The cam device 115 includes a movable-side cam 117 and a fixed-side cam 118. The movable-side cam 117 is externally supported by the adjusting rod 112, and has a movable-side-cam surface that is an uneven surface in a circumferential direction at an inner side surface (right side surface in FIG. 16) in the width direction of the vehicle body. The fixed-side cam 118 is supported so as not to rotate relative by the support plate portion 109 on the one side in the width direction, and has a fixed-side-cam surface which is an uneven surface in the circumferential direction, on an outer side surface (left side surface in FIG. 16) in the width direction of the vehicle body which faces the movable-side-cam surface.

A base portion of the adjusting lever 116 is fixed to the movable-side cam 117 so relative rotation is not possible. The cam device 115 rotates the movable-side cam 117 relative to the fixed-side cam 118 based on the operation of the adjusting lever 116, thereby changing the rotation phase between the movable-side-cam surface and the fixed-side-cam surface, and increasing or decreasing a dimension in the width direction. As a result, by increasing or decreasing a space between the pair of support plate portions 109, it is possible to adjust the magnitude of a force that sandwiches the pair of sandwiched plate portions 106.

In an unlocked state in which the dimension in the width direction of the cam device 115 is decreased to reduce the force with which the pair of sandwiched plate portions 106 are sandwiched by the pair of support plate portions 109, the position of the steering wheel can be adjusted within a range in which the adjusting rod 112 can be displaced inside the column-side through holes 110 and the vehicle-body-side through holes 111. On the other hand, in the locked state in which the dimension in the width direction of the cam device 115 is increased to increase the force with which the pair of sandwiched plate portions 106 are sandwiched by the pair of support plate portions 109, it becomes possible to maintain the steering wheel in the adjusted position.

In order to increase the force maintaining the steering wheel in the adjusted position, a friction unit 119 is sandwiched in each of a portion between an outer-side surface of the support plate portion 109 on the one side in the width direction and an inner-side surface of the fixed-side cam 118, and a portion between an outer-side surface of the support plate portion 109 on the other side in the width direction and an inner-side surface of the retaining member 114. The friction unit 119 is configured by alternately stacking a plurality of telescopic friction plates 120 and a plurality of washers 121.

The telescopic friction plate 120 has a flat plate shape, extends in the front-rear direction, and has a front-rear direction long hole 122 through which the adjusting rod 112 is inserted. The telescopic friction plate 120 has a mounting hole 123, which is a circular hole, further on the front side than the front-rear direction long hole 122. The telescopic friction plate 120 is supported by the outer column 105 by inserting a hook portion (pin) 124 having a cantilever beam structure provided on an outer peripheral surface of the outer column 105 into the mounting hole 123. The adjusting rod 112 is inserted through a through hole provided in a central portion of the washer 121. By providing such a friction unit 119, a friction area is increased, which increases the force maintaining the steering wheel in the adjusted position.

CITATION LIST

Patent Literature

Patent Literature 1: JP 2011-148487A

SUMMARY

Problem to be Solved

In the conventional structure described in JP 2011-148487A, when the cam device 115 is unlocked, the amount of movement in the width direction of the telescopic friction plate 120 with respect to the hook portion 124 may increase.

That is, the telescopic friction plate 120 is generally formed by pressing a coil material. The coil material is subjected to a straightening process using a roller leveler or the like to remove the curl or distortion of the coil material; however, it is difficult to completely remove the curl or distortion. Therefore, when the cam device 115 is unlocked to release the force holding the telescopic friction plates 120 in the width direction, the telescopic friction plates 120 are likely to be bent or warped such that the outer-side surface or the inner-side surface becomes concave. In addition, in the conventional structure described in JP 2011-148487A, the hook portion 124 is configured in a simple circular column shape in which the outer diameter does not change over the entire length.

Therefore, as illustrated in FIG. 17, when the cam device 115 is unlocked, there is a possibility that, of the telescopic friction plates 120 arranged on the outermost side in the width direction, the movement amount in the width direction with respect to the hook portion 124 of the telescopic friction plate 120 of which one side (the upper side in FIG. 17) is curved so that the outer surface becomes a concave surface will become large, and a hook margin for the hook portion 124 will become small.

The present invention has been made to solve the problems described above, with an object of the present invention being to provide a steering column device capable of restricting the movement of a friction plate in the width direction with respect to a hook portion.

Solution to Problem

The steering column device according to one aspect of the present invention includes a steering column, a vehicle-body-side bracket, an adjusting rod, a pair of pressing portions, an expansion/contraction mechanism, a friction plate, and a hook portion.

The steering column includes a column-side bracket having a column-side through hole penetrating in a width direction.

The vehicle-body-side bracket includes a pair of support plate portions arranged on both sides in the width direction of the column side bracket, each having a vehicle-body-side through hole penetrating in the width direction.

The adjusting rod is inserted through the column-side through-hole and the pair of vehicle-body-side through-holes in the width direction.

The pair of pressing portions is provided at portions of the adjusting rod protruding in the width direction from outer-side surfaces of the pair of support plate portions.

The expansion/contraction mechanism is configured to expand or contract a distance between the pair of pressing portions.

The friction plate has a long hole extending in a direction in which a position of a steering wheel should be adjustable and through which the adjusting rod is inserted, and a mounting hole. The friction plate is sandwiched at least one of a portion between one of inner-side surfaces of the pair of support plate portions and an outer-side surface of the column-side bracket, and a portion between one of outer-side surfaces of the pair of support plate portions and one of inner-side surfaces of the pair of pressing portions.

The hook portion has a cantilever beam structure and is inserted through the mounting hole in the width direction.

The hook portion has a restricting projection for restricting movement in the width direction of the friction plate.

In the steering column device of one aspect of the present invention, the restricting projection projects in a direction perpendicular to the width direction and a lengthwise direction of the long hole.

In a case where the long hole is a front-rear direction long hole, the restricting projection projects upward or downward.

In a case where the long hole is an up-down direction long hole, the restricting projection projects toward the front or toward the rear.

In the steering column device according to one aspect of the present invention, the restricting projection is provided integrally with the hook portion on an outer peripheral surface of an end portion of the hook portion.

In the steering column device according to one aspect of the present invention, the restricting projection is configured separately from the hook portion and fixed to the hook portion.

In the steering column device according to one aspect of the present invention, the hook portion is inserted through the mounting hole with relative rotation therebetween being substantially not possible.

In the steering column device according to one aspect of the present invention, in a case where the long hole is a front-rear direction long hole, the hook portion is provided on an outer peripheral surface of the steering column. In this case, the friction plate is configured by a telescopic friction plate.

In a case where the long hole is an up-down direction long hole, the hook portion is provided on a side surface of the support plate portion. In this case, the friction plate is configured by a tilt friction plate.

In the steering column device according to one aspect of the present invention, the friction plate is curved with an outer-side surface thereof being a concave surface in a free state.

In the steering column device according to one aspect of the present invention, the steering column has an outer column arranged on a front side, an inner column arranged on a rear side, and a support bracket.

The outer column includes a slit extending in an axial direction (front-rear direction), and a pair of sandwiched plate portions constituting the column-side bracket that is arranged on both sides of the slit in the width direction of the slit and is provided with the column-side through hole. The support bracket includes a mounting portion arranged inside the slit and detachably attached to the inner column, and the hook portion. The long hole is a front-rear direction long hole extending in the front-rear direction.

The friction plate is provided such that one or more friction plates respectively sandwiched between the inner-side surfaces of the pair of support plate portions and outer-side surfaces of the pair of sandwiched plate portions. The hook portion is configured by two hook portions. The restricting projection is provided in at least one hook portion of the two hook portions. The restricting projection may also be provided in the two hook portions. Alternatively, the restricting projection may be provided in only one hook portion of the two hook portions, and the restricting projection need not be provided in the other hook portion of the two hook portions.

Particularly, in a configuration in which the restricting projection is provided on only one hook portion of the two hook portions, and a plurality of friction plates is respectively sandwiched between the inner-side surfaces of the pair of support plate portions and the outer-side surfaces of the pair of sandwiched plate portions, the friction plate arranged on the outermost side in the width direction of the plurality of friction plates in which the one hook portion is inserted through the mounting hole is arranged in a curved state so that the outer-side surface thereof becomes a concave surface in a free state, and the friction plate arranged on the outermost side in the width direction of the plurality of friction plates in which the other hook portion is inserted through the mounting hole is arranged in a curved state so that the outer-side surface thereof becomes a convex surface in a free state.

Advantageous Effect

According to one aspect of the present invention, a steering column device is provided that can restrict movement in the width direction of a friction plate with respect to a hook portion.

BRIEF DESCRIPTION OF THE DRAWINGS

FIG. 7A is a front view illustrating a support bracket of the steering column device of the first example; FIG. 7C is a right side view thereof.

DESCRIPTION OF EMBODIMENTS

First Example

A first example of an embodiment of the present invention will be described with reference to FIG. 1 to FIGS. 12A and 12B. In the present example, a steering column device is incorporated in an electric power steering device for an automobile. In the following description, a front-rear direction means a front-rear direction of a vehicle in which the electric power steering device is installed, an up-down direction means an up-down direction of the vehicle, and a width direction means a width direction of the vehicle.

[Overall Structure of Electric Power Steering Device]

Figure 1:
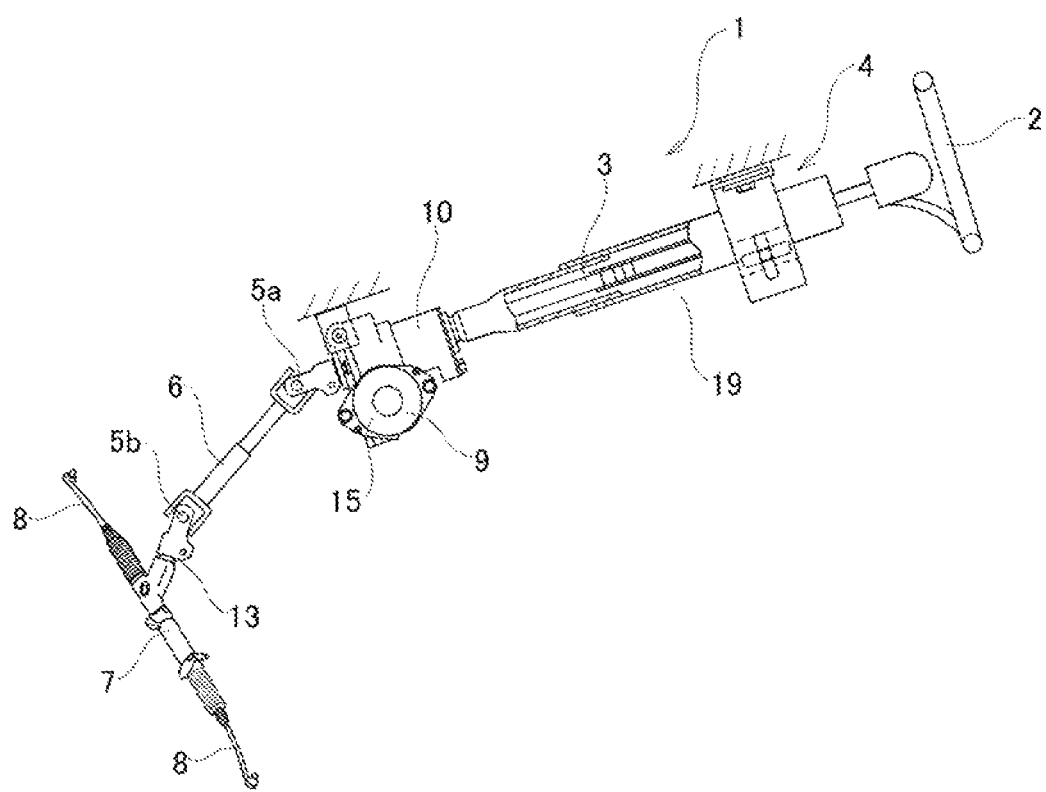
FIG. 1 is a partial cutaway side view schematically illustrating an electric power steering apparatus incorporating a steering column device of a first example of an embodiment of the present invention.

The electric power steering device 1 of the present example is a column assist type electric power steering device. As illustrated in FIG. 1, an electric power steering device 1 includes a steering wheel 2, a steering shaft 3, a steering column device 4, a pair of universal joints 5a, 5b, an intermediate shaft 6, a steering gear unit 7, a pair of tie rods 8, and an electric power assist device 9.

Figure 2:
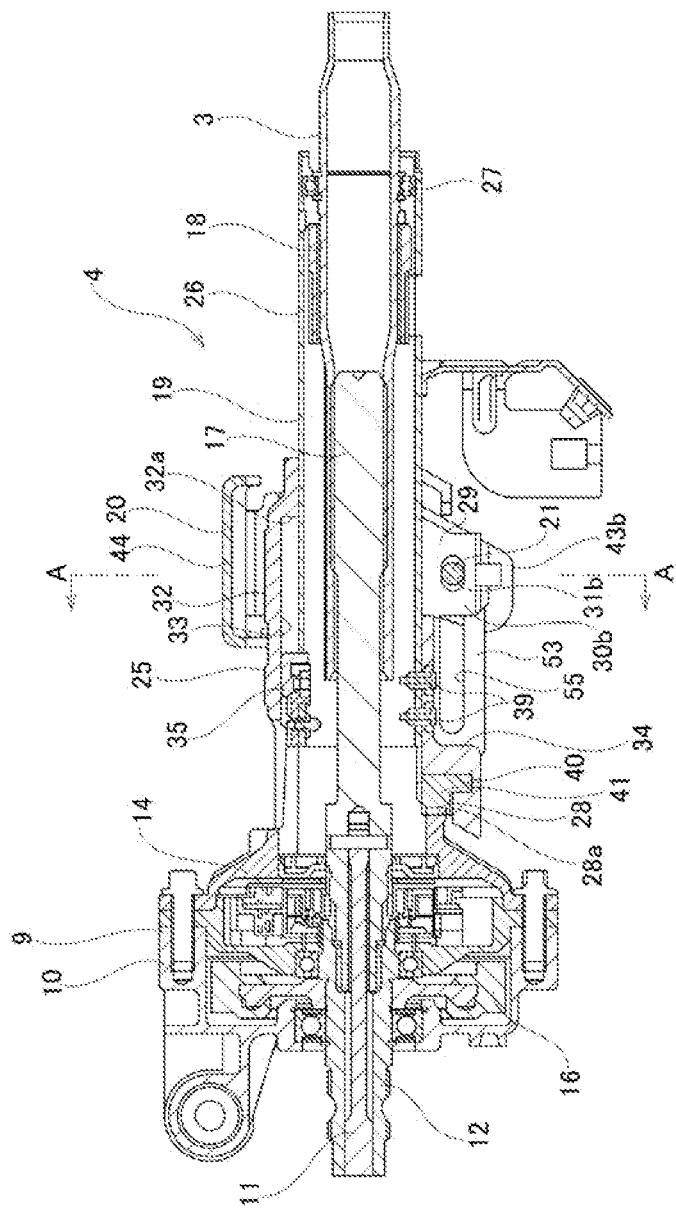
FIG. 2 is a cross-sectional view illustrating the steering column device of the first example.

The steering wheel 2 is fixed to an end portion on a rear side of the steering shaft 3. The steering shaft 3 is rotatably supported inside a steering column 19 of the steering column device 4. An end portion on a front side of the steering shaft 3, as illustrated in FIG. 2, is inserted inside a gear housing 10 fixed to an end portion on a front side of the steering column 19 and connected to an output shaft 12 through a torsion bar 11.

Rotation of the output shaft 12 is transmitted to a pinion shaft 13 of the steering gear unit 7 through the pair of universal joints 5a, 5b and the intermediate shaft 6. Rotation of the pinion shaft 13 is converted into linear motion of a rack shaft (not illustrated) to push and pull the pair of tie rods 8, thereby applying a steering angle to steered wheels.

The electric power assist device 9 generates an assist torque for reducing the force required for the driver to operate the steering wheel 2. The electric power assist device 9 includes a gear housing 10, a torque sensor 14, an ECU (not illustrated), an electric motor 15, and a worm speed reducer 16.

The torque sensor 14 is arranged around the output shaft 12 and detects a twist direction and a twist amount of the torsion bar 11. The ECU determines the assist torque based on information related to steering torque calculated based on the twist direction and twist amount of the torsion bar 11 detected by the torque sensor 14, and based on information related to vehicle speed measured by a vehicle speed sensor (not illustrated). The electric motor 15 is fixed to the gear housing 10, and a direction and amount of electric current to the electric motor 15 are controlled by the ECU. The worm speed reducer 16 increases the torque of the electric motor 15 and transmits the torque to the output shaft 12. As a result, an assist torque is applied to the output shaft 12, and the pair of tie rods 8 are pushed and pulled with a force greater than the force applied to the steering wheel 2 by the driver.

[Steering Column Device]

The steering column device 4 of the present example is for rotatably supporting the steering shaft 3 with respect to the vehicle body, and includes a position adjusting mechanism (tilt mechanism and telescopic mechanism) capable of adjusting the up-down position and the front-rear position of the steering wheel 2, and includes an impact absorbing mechanism for alleviating an impact load applied to the driver's body in the event of a secondary collision. In the present example, in order to enable adjustment of the front-rear position of the steering wheel 2, the steering shaft 3 is configured by combining an inner shaft 17 arranged at the front and an outer shaft 18 arranged at the rear by a spline engagement or the like so as to be capable of transmitting torque and capable of being expanded or contracted.

The steering column device 4 includes a steering column 19 having a hook portion 42, a vehicle-body-side bracket 20, an adjusting rod 21, an adjusting lever 22 and a cam device 23 that constitute an expansion/contraction mechanism, a thrust bearing 24, and a friction unit 52 having a telescopic friction plate 53. In the present example, the thrust bearing 24 and a fixed-side cam 51 of the cam device 23 correspond to a pair of pressing portions, and the telescopic friction plate 53 corresponds to a friction plate.

<Steering Column>

The steering column 19 has a substantially cylindrical shape and is supported with respect to the vehicle body with the axial direction thereof oriented in the front-rear direction. The steering column 19, in order to allow adjustment of the front-rear position of the steering wheel 2, is configured such that an entire length thereof is capable of being expanded or contracted by loosely fitting a front-side portion of an inner column 26 arranged at the rear to a rear-side portion of an outer column 25 arranged at the front so as to allow relative displacement in the 0 axial direction. The steering shaft 3 is rotatably supported inside the steering column 19 through a rolling bearing 27.

<Outer Column>

The outer column 25 is made of a metal such as an iron-based alloy or an aluminum-based alloy, and has a tubular shape as a whole. Of the outer column 25, an end portion at the front side is fixed to the gear housing 10 that is supported so as to be capable of oscillating in the up-down direction with respect to the vehicle body, and an end portion at the rear side is supported by the vehicle-body-side bracket 20. The outer column 25 has a slit 28 and a column-side bracket 29.

The slit 28 extends in the axial direction of the outer column 25, and is for enabling expansion and contraction of the inner diameter of a rear side portion of the outer column 25. The slit 28 is provided so as to span from a front-side portion to an end portion on the rear side of a lower surface of the outer column 25. The slit 28 is open to both an inner and outer peripheral surface of the outer column 25, and is also open to an end surface on the rear side of the outer column 25.

The column-side bracket 29 is provided at the end portion on the rear side of the outer column 25. The column-side bracket 29 is configured by a pair of sandwiched plate portions 30a, arranged on both sides in the width direction of the slit 28. The pair of sandwiched plate portions 30a, 30b is configured in a substantially flat plate shape. The pair of sandwiched plate portions 30a, 30b extends in the up-down direction and is arranged spaced apart in the width direction. The pair of column-side through-holes 31a, 31b is formed in the pair of sandwiched plate portions 30a, 30b so as to penetrate in the width direction at mutually matching portions. The pair of column-side through holes 31a, 31b is arranged coaxially with each other. Each of the column-side through holes 31a, 31b is configured by a substantially circular hole.

The outer column 25 has a bulge portion 32. The bulge portion 32 extends in the axial direction of the outer column 25 and bulges outward in the radial direction. The bulge portion 32 is provided from an intermediate portion of an upper portion of the outer column 25 to the rear side portion of the outer column 25. In the present example, by providing the outer column 25 with the bulge portion 32, an accommodating space 33 is formed between the outer column 25 and the inner column 26.

<Inner Column>

The inner column 26 is made of metal such as an iron-based alloy or an aluminum-based alloy. The inner column 26 has a cylindrical shape as a whole.

The steering column 19 of the present example, as illustrated in FIG. 2, has a support bracket 34 with the hook portion 42, and a stopper member 35 for limiting the adjustable range in the front-rear direction of the steering wheel 2. Both the support bracket 34 and the stopper member are attached to an outer peripheral surface of the inner column 26.

<Support Bracket>

Figure 4:
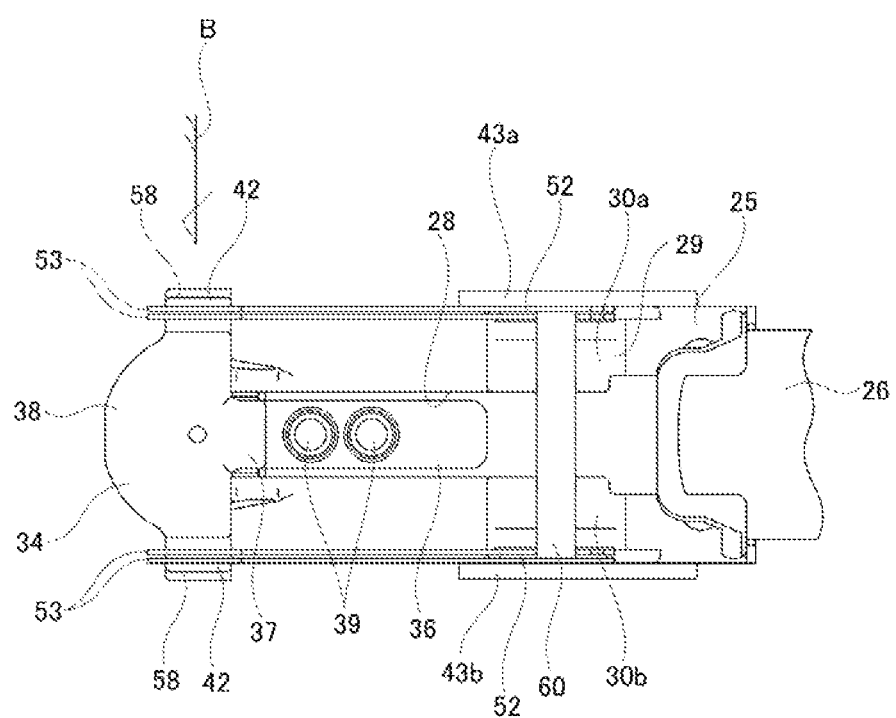
FIG. 4 is a partial bottom view of the steering column device of the first example.
Figure 5:
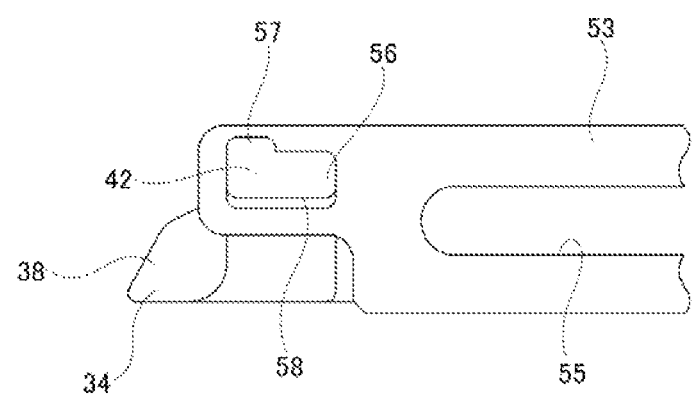
FIG. 5 is a side view in the direction arrow B in FIG. 4.

The support bracket 34 has a function of supporting the telescopic friction plate 53, and as a contraction-side stopper mechanism, has a function of preventing the steering wheel 2 from being excessively displacing toward the front. The support bracket 34, as illustrated in FIG. 2 and FIG. 4, is detachably attached to the lower surface of the front end portion of the inner column 26. The support bracket 34 is made of metal and, as illustrated in FIGS. 7A to 7C and FIGS. 8A and 8B, is generally T-shaped as a whole. The support bracket 34 integrally has a mounting portion 36, a connecting portion 37, and a body portion 38.

The mounting portion 36 is configured in a rectangular plate shape, and, as illustrated in FIG. 4, is arranged at an inner side of the slit 28 provided in the outer column 25. A small space is provided between an outer-side surface in the width direction of the mounting portion 36 and an inner-side surface in the width direction of the slit 28 so that the mounting portion 36 can move toward the front and rear within the slit 28. The mounting portion 36 is detachably attached to a central portion in the width direction of the lower surface of the inner column 26 using a plurality of shear pins 39 (two in the illustrated example) made of a material such as synthetic resin or aluminum-based alloy that easily shears. In order for this, a plurality of through holes 36a is formed in the mounting portion 36.

The connecting portion 37 connects a front-end portion of the mounting portion 36 and an upper-side surface of the central portion in the width direction of the body portion 38, and extends in the up-down direction. A locking recess portion 40 recessed toward the rear side is provided at the front-end surface of the connecting portion 37. A cushioning material 41 (see FIG. 2) made of an elastic material is locked in the locking recess portion 40.

The body portion 38 has a substantially U shape when viewed in the front-rear direction. The body portion 38 has the hook portion 42 configured by a pair of hook portions 42 extending in opposite directions in the width direction and each having a cantilever beam structure at end portions on both sides in the width direction. Each of the pair of hook portions 42 has a substantially square column shape and is inserted in the width direction through the mounting hole 56 of the telescopic friction plate 53.

In the present example, when the steering wheel 2 is moved to a front end position of an adjustable range, the cushioning material 41 attached to the support bracket 34 comes into contact with a front-end edge 28a of the slit 28. As a result, the steering wheel 2 is prevented from displacing further forward.

<Stopper Member>

A stopper member 35 constitutes an extension-side stopper mechanism and has a function of preventing the steering wheel 2 from being excessively displaced toward the rear. As illustrated in FIG. 2, the stopper member 35 is attached to a central portion in the width direction of the upper surface of the front-end portion of the inner column 26. The stopper member 35 is arranged in the accommodating space 33 formed inside the bulge portion 32 of the outer column 25.

In the present example, when the steering wheel 2 is moved to a rear-end position of the adjustable range, the stopper member 35 comes into contact with a forward facing abutting surface 32a of an inner surface of the bulge portion 32. As a result, the steering wheel 2 is prevented from being displaced further rearward, and the inner column 26 is prevented from coming out of the outer column 25 toward the rear side.

<Vehicle-body-side Bracket>

Figure 3:
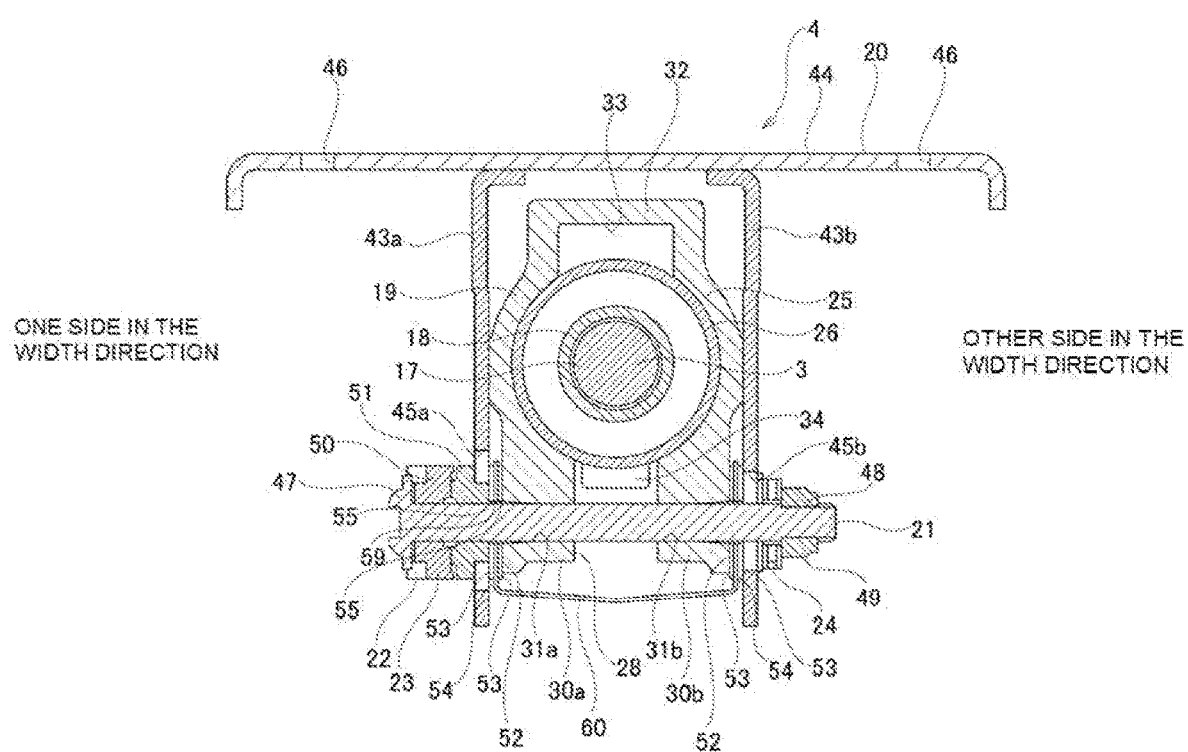
FIG. 3 is a cross-sectional view taken along the line A-A of FIG. 2.

The vehicle-body-side bracket 20 supports the end portion on the rear side of the outer column 25 with respect to the vehicle body so as to be switchable between an unclamped state in which the up-down position and the front-rear position of the steering wheel 2 can be adjusted, and a clamped state in which the steering wheel 2 is maintained in the adjusted position. The vehicle-body-side bracket 20 is made of a rigid metal plate having sufficient rigidity such as steel or an aluminum alloy, and, as illustrated in FIG. 3, has a pair of support plate portions 43a, 43b and a top plate portion 44.

The pair of support plate portions 43a, 43b is arranged on both sides in the width direction of the pair of sandwiched plate portions 30a, 30b of the column-side bracket 29. Each of the pair of support plate portions 43a, 43b is configured in a substantially flat plate shape. The pair of support plate portions 43a, 43b extends in the up-down direction, and the support plate portions 43a, 43b is arranged spaced apart in the width direction. Vehicle-body-side through holes 45a, 45b penetrating in the width direction are formed in the pair of support plate portions 43a, 43b at portions aligned with each other. The vehicle-body-side through holes 45a, 45b are long holes extending in the up-down direction. More specifically, the vehicle-body-side through holes 45a, are, for example, long holes extending in an arc direction about the center of oscillation of the gear housing 10. Note that in a case where the tilt mechanism is not provided, the vehicle-body-side through-holes are configured by simply circular holes.

The top plate portion 44 is arranged above the steering column 19. Upper end portions of the pair of support plate portions 43a, 43b are fixed to a lower surface of the top plate portion 44 by welding or the like. A plurality of through holes 46 penetrating in the up-down direction is provided in the top plate portion 44. The top plate portion 44 is fixed to the vehicle body using fixing members such as bolts (not illustrated) inserted through the through holes 46.

<Adjusting Rod>

The adjusting rod 21 is arranged so that an axial direction thereof faces in the width direction of the steering column device, and is inserted in the width direction through the pair of column-side through holes 31a, 31b and the pair of vehicle-body-side through holes 45a, 45b. A total length of the adjusting rod 21 is longer than a space between the outer-side surfaces of the pair of support plate portions 43a, 43b. The adjusting rod 21 includes an anchor portion 47 at an end portion (head portion) on one side in the width direction (left side in FIG. 3) and a male threaded portion 48 at an end portion on the other side in the width direction (right side in FIG. 3).

The adjusting lever 22 and the cam device 23 are arranged in order from the outside in the width direction around a portion of the adjusting rod 21 that protrudes in the width direction from the outer-side surface of the support plate portion 43a arranged on the one side in the width direction. That is, the adjusting lever 22 and the cam device 23 are arranged in the width direction between the inner-side surface of the anchor portion 47 and the outer-side surface of the support plate portion 43a. A nut 49 and a thrust bearing 24 are arranged in order from the outside in the width direction around a portion of the adjusting rod 21 that protrudes in the width direction from the outer-side surface of the support plate portion 43b arranged on the other side in the width direction. The nut 49 is screwed onto the male threaded portion 48 of the adjusting rod 21.

<Expansion/Contraction Mechanism and Pair of Pressing Portions>

The cam device 23 includes a movable-side cam 50 arranged on the outer side in the width direction and a fixed-side cam 51 arranged on the inner side in the width direction. The movable-side-cam 50 is made of sintered metal and, on an inner-side surface thereof in the width direction of the vehicle body, has a movable-side-cam surface, which is an uneven surface in the circumferential direction. The movable-side cam 50 is fixed to a base portion of the adjusting lever 22 and rotates back-and-forth as the adjusting lever 22 oscillates back-and-forth. Note that the base portion of the adjusting lever 22 and the movable-side cam 50 can be fixed to the adjusting rod 21 so as to rotate integrally with the adjusting rod 21, or can be externally fitted to the adjusting rod 21 so as to be relatively rotatable.

The fixed-side cam 51 is made of sintered metal, and, on the outer-side surface in the width direction of the vehicle body, has a fixed-side cam surface, which is an uneven surface in the circumferential direction, and, on the—inner side surface, has an engaging protruding portion substantially rectangular shape protruding inward in the width direction. The fixed-side cam 51 is externally fitted to the adjusting rod 21 so as to be relatively rotatable with respect to the adjusting rod 21 and relatively displaceable in the width direction with respect to the adjusting rod 21. The fixed-side cam 51 engages the engaging protruding portion with the vehicle-body-side through hole 45a of the support plate portion 43a arranged on the one side in the width direction so that only displacement along the vehicle-body-side through hole 45a is possible.

Rotating the movable-side cam 50 relative to the fixed-side cam 51 based on an oscillating operation of the adjusting lever 22 changes the rotation phase between the movable-side cam surface and the fixed-side cam surface, which expands or contracts the dimension in the width direction of the cam device 23. As a result, the space between the fixed-side cam 51 of the cam device 23 and the thrust bearing 24 is increased or decreased, and the space between the pair of support plate portions 43*a*, 43*b* is increased or decreased. In the present example, the fixed-side cam 51 of the cam device 23 and the thrust bearing 24 correspond to the pair of pressing portions, and the expansion/contraction device is configured by the adjusting lever 22 and the cam device 23.

In the present example, in order to increase the force for maintaining the steering wheel 2 in the adjusted position (especially the force for maintaining the front-rear position), a friction unit 52 is sandwiched respectively at a portion between the inner-side surface of the support plate portion 43*a* on the one side in the width direction and the outer-side surface of the sandwiched plate portion 30*a* on the one side in the width direction, and at a portion between the inner-side surface of the support plate portion 43*b* on the other side in the width direction and the outer-side surface of the sandwiched plate portion 30*b* on the other side in the width direction. In the present example, the friction unit 52 is configured by alternately stacking one or more telescopic friction plates 53 and one or more fixed-side friction plates 54 in the width direction. In the illustrated example, the friction unit 52 is configured by sandwiching one fixed-side friction plate 54 between two telescopic friction plates 53.

<Friction plate and Hook Portion>

Figure 10A:
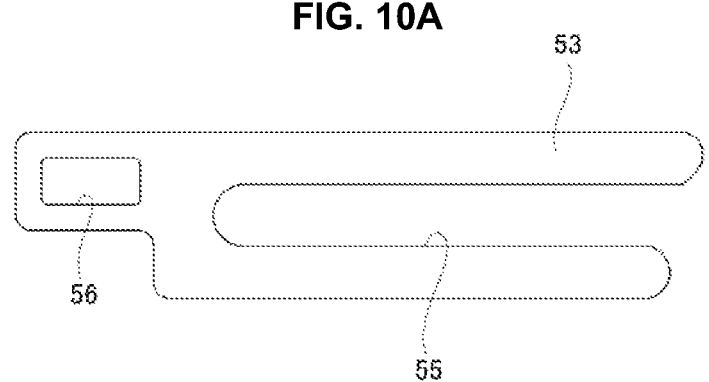
FIG. 10A is a front view illustrating a telescopic friction plate of the steering column device of the first example.
Figure 10B:
FIG. 10B is a plan view thereof.

The telescopic friction plate 53 is formed by subjecting a metal coil material having a large coefficient of friction with respect to the inner-side surfaces of the supporting plate portions 43*a*, 43*b* and to the outer-side surfaces of the sandwiched plate portions 30*a*, 30*b* to pressing and, if necessary, correction processing. As illustrated in FIG. 10A, the telescopic friction plate 53 is configured by a flat plate and has a substantially rectangular shape (substantially Y shape) extending in the front-rear direction. As illustrated in FIG. 10B, the telescopic friction plate 53 is curved so a side surface on one side thereof is a concave surface in a free state. That is, the telescopic friction plate 53 has a curve (warp) such that the side surface on the one side is the concave surface and a side surface on the other side is a convex surface. The telescopic friction plate 53 is formed by stamping a coil material from a predetermined direction by pressing, and thus the curve in the same direction exists in the plurality of telescopic friction plates 53.

Figure 11:
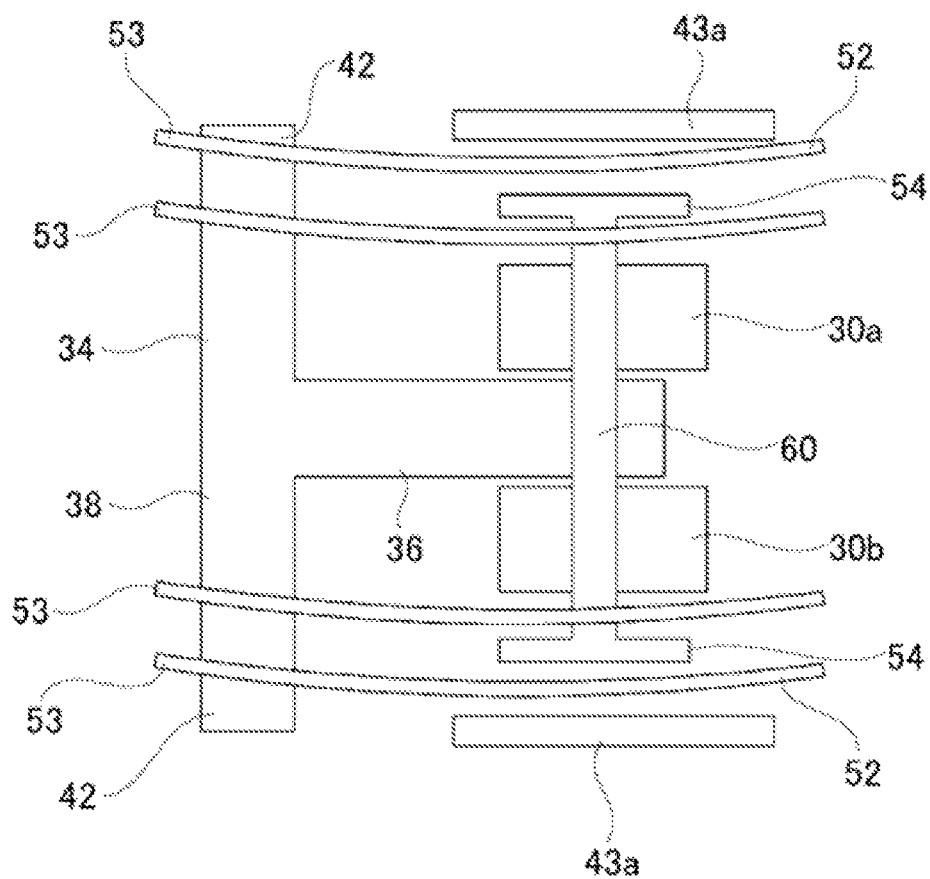
FIG. 11 is a bottom view of the support bracket and friction unit of the steering column device of the first example, exaggerating the curvature of the telescopic friction plate.

In the present example, as illustrated in FIG. 11, in an unlocked state of the cam device 23 (free state of the telescopic friction plates 53), a plurality of (two in the illustrated example) telescopic friction plates 53 arranged on the one side in the width direction is arranged in a curved state so that the outer-side surface thereof becomes a concave surface, and a plurality of (two in the illustrated example) telescopic friction plates 53 arranged on the other side in the width direction are arranged in a curved state so that the outer-side surface thereof becomes a convex surface.

The telescopic friction plate 53, in a range from an intermediate portion in the front-rear direction (lengthwise direction) to a rear end portion, has a substantially rectangular front-rear direction long hole 55 extending in the front-rear direction and penetrating in the width direction. In the illustrated example, the front-rear direction long hole 55 is formed in a slit shape that opens at the rear-end edge of the telescopic friction plate 53. The adjusting rod 21 is inserted in the width direction through the front-rear direction long hole 55. In the present example, the front-rear direction long hole 55 is formed in a slit shape, and thus compared with a telescopic friction plate provided with a front-rear direction long hole having a closed periphery, the telescopic friction plate 53 tends to have larger bending.

Figure 6:
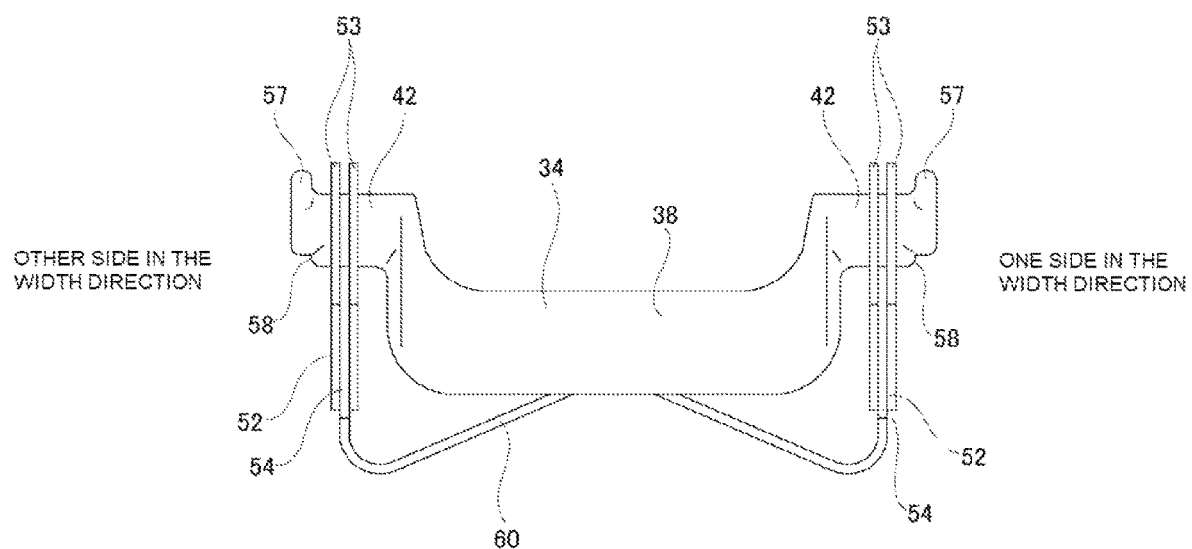
FIG. 6 is an end view as viewed from the left side in FIG. 4 of a support bracket and a friction unit of the steering column device of the first example.
Figure 7B:
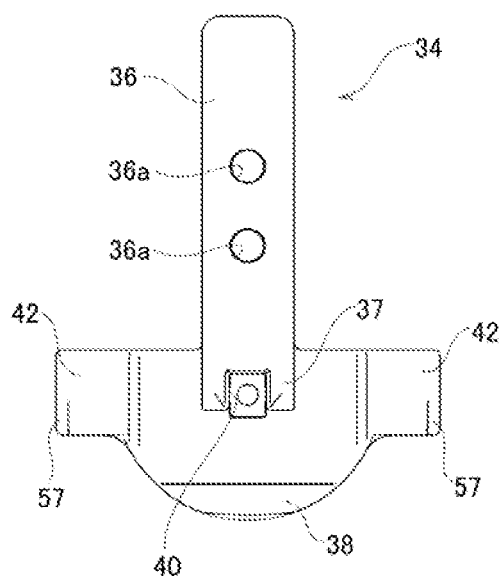
FIG. 7B is a plan view thereof.
Figure 7B:
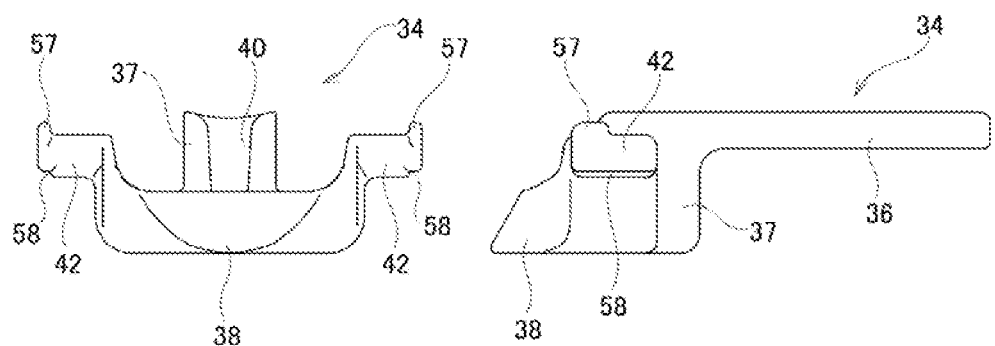
Figure 8A:
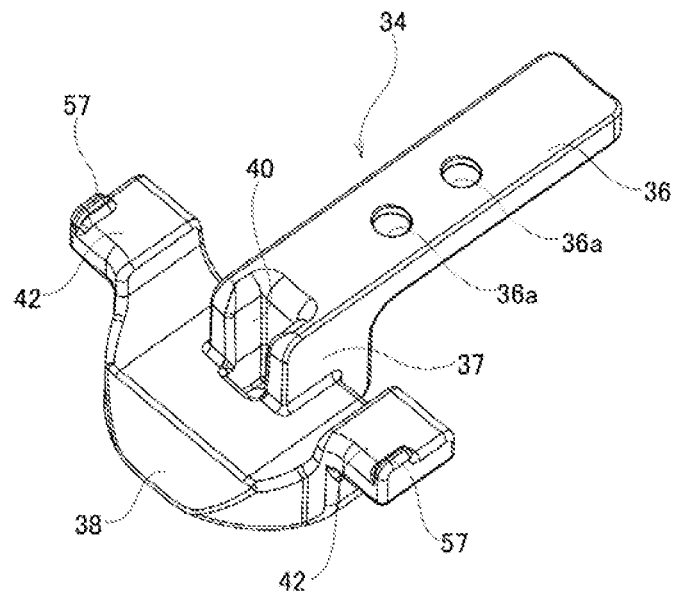
FIG. 8A is a perspective view as seen from above of the support bracket of the steering column device of the first example.
Figure 8B:
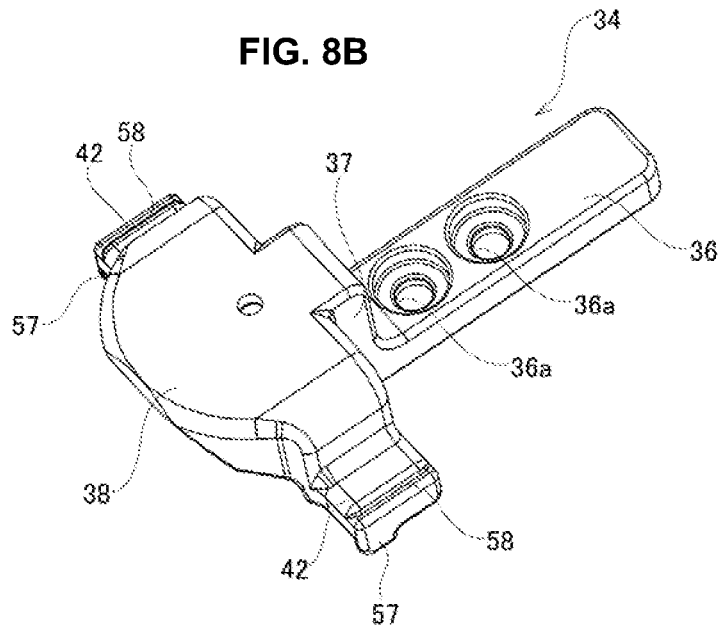
FIG. 8B is a perspective view as seen from below thereof.
Figure 9A:
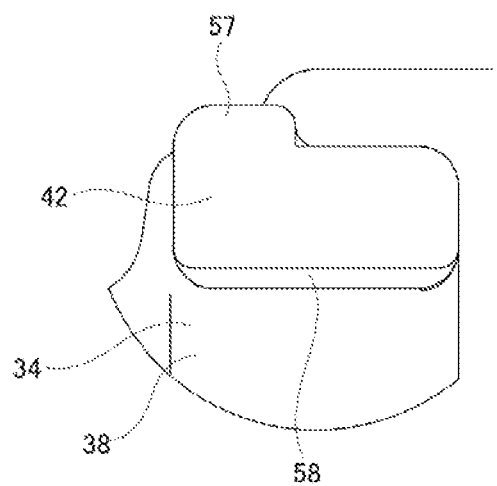
FIG. 9A is an end view as viewed from the outside in the width direction of a hook portion of the steering column device of the first example.
Figure 9B:
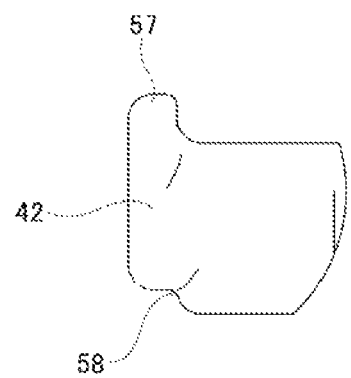
FIG. 9B is a partial enlarged view of FIG. 7A.

The telescopic friction plate 53 has a mounting hole 56 penetrating in the width direction at a front end portion located further toward the front than the front-rear direction long hole 55. The mounting hole 56 is a rectangular hole having a rectangular shape and penetrates in the width direction. As illustrated in FIG. 4 and FIG. 6, the hook portion 42 of the support bracket 34 is inserted inside the mounting hole 56 so that the telescopic friction plate 53 can be displaced in the width direction. As a result, the telescopic friction plate 53 is supported with respect to the support bracket 34 (inner column 26) so as to be relatively displaceable only in the width direction. When adjusting the front-rear position of the steering wheel 2, the telescopic friction plate 53 is displaced in the front-rear direction together with the inner column 26.

In the present example, the hook portion 42 has a square column shape (rectangular parallelepiped shape), and the mounting hole 56 is a rectangular hole, and thus the hook portion 42 is inserted through the mounting hole 56 such that relative rotation is substantially not possible.

In the present example, a restricting projection 57 for restricting movement in the width direction of the telescopic friction plate 53 with respect to the hook portion 42 is provided on the outer peripheral surface of the tip-end portion (end portion on the outer side in the width direction) of each of the two hook portions 42 provided on the support bracket 34. More specifically, the restricting projection 57 is provided in a shape of a flange at a front half portion of an upper surface of the tip-end portion of the hook portion 42, and protrudes upward, which is a direction perpendicular to both the width direction and the front-rear direction long hole 55. The restricting projection 57 is formed of a thin plate that is substantially rectangular when viewed in the width direction. The restricting projection 57 is provided integrally with the hook portion 42. As illustrated in FIG. 6, an inner-side surface of the restricting projection 57 faces in the width direction a portion of the outer-side surface of the telescopic friction plate 53 arranged on the outermost side in the width direction that is located above the mounting hole 56 in the width direction. The projection amount of the restricting projection 57 is smaller than the dimension in the up-down direction of the portion of the telescopic friction plate 53 located above the mounting hole 56.

The hook portion 42, at a lower-side portion of a tip-end surface opposite to an upper-side portion where the restricting projection 57 is provided, has an escape recess 58 that is recessed inward in the width direction. The escape recess 58 prevents the lower end edge of the mounting hole 56 of the telescopic friction plate 53 from coming into contact with the tip-end surface of the hook portion 42 when the telescopic friction plate 53 is attached to the hook portion 42.

Figure 12A:
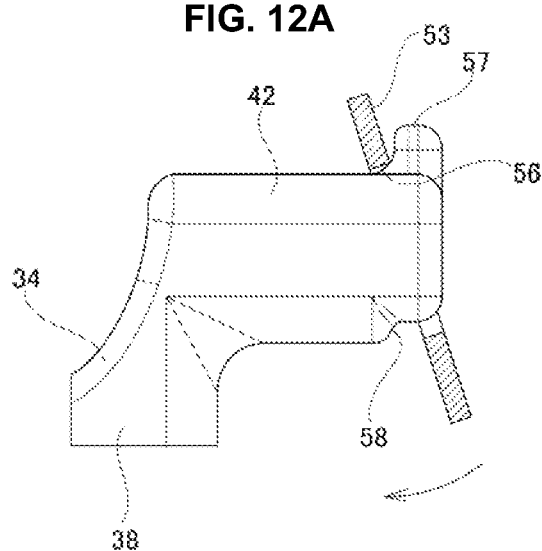
FIG. 12A and FIG. 12B are diagrams illustrating, in order of steps, a method of assembling a telescopic friction plate to a hook portion in the steering column device of the first example.
Figure 12B:
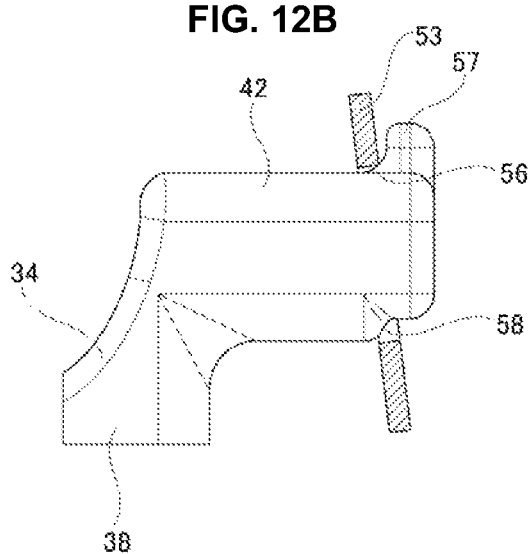

In order to assemble the telescopic friction plate 53 to the hook portion 42 (to insert the hook portion 42 inside the mounting hole 56), first, as illustrated in FIG. 12A, in a state in which the telescopic friction plate 53 is tilted so that the upper-side portion is positioned more inward in the width direction than the lower-side portion, the upper-edge portion of the mounting hole 56 is hooked (locked) to the restricting projection 57 of the hook portion 42 from the inner side in the width direction. Next, as illustrated in FIG. 12B, the hook portion 42 is inserted into the mounting hole 56 while rotating the telescopic friction plate 53 in a direction in which the angle of inclination is decreased. In the present example, the escape recess 58 is provided in the hook portion 42, and thus, the lower end edge of the mounting hole 56 of the telescopic friction plate 53 is prevented from coming into contact with the tip-end surface of the hook portion 42.

In the present example, the fixed-side friction plate 54 is made of a metal plate such as a steel plate having a large friction coefficient with respect to the side surface of the telescopic friction plate 53, and has a circular hole 59 penetrating in the width direction. The adjusting rod 21 is inserted in the width direction through the circular hole 59 provided in the fixed-side friction plate 54. In the present example, the fixed-side friction plate 54 arranged on the one side in the width direction and the fixed-side friction plate 54 arranged on the other side in the width direction are connected in the width direction by a connecting portion 60 at the lower-end portions. The fixed-side friction plate 54 is displaced in synchronization with the adjusting rod 21 when adjusting the up-down position and the front-rear position of the steering wheel 2. That is, the fixed-side friction plate 54 displaces in the up-down direction together with the adjusting rod 21 when adjusting the up-down position of the steering wheel 2, and remains at the current position when adjusting the front-rear position of the steering wheel 2.

In order to reduce the impact load applied to the driver's body in the event of a secondary collision, the steering column device 4 of the present example includes an impact absorbing mechanism that allows the steering wheel 2 to displace forward. In the present example, as illustrated in FIG. 2 and FIG. 4, the support bracket 34 that supports the front-end portion of the telescopic friction plate 53 is attached to the inner column 26 by shear pins 39. When a secondary collision occurs and a strong forward force is applied from the steering wheel 2 to the support bracket 34 through the outer shaft 18 and the inner column 26, the shear pins 39 shear. As a result, displacement in the forward direction of the inner column 26, the outer shaft 18 supported by the inner column 26, and the steering wheel 2 is allowed, which alleviates an impact load applied to the driver's body.

In the steering column device 4 of the present example, when adjusting the position of the steering wheel 2, the movable-side cam 50 is rotated in a lock-release direction by oscillating the adjusting lever 22, which reduces the dimension in the width direction of the cam device 23, and the widens the distance between the fixed-side cam 51 and the thrust bearing 24. As a result, the force with which the pair of sandwiched plate portions 30a, 30b are sandwiched from both sides in the width direction by the pair of support plate portions 43a, 43b is reduced or lost, and at the same time, the inner diameter of the outer column 25 is elastically expanded, and the contact pressure of the contact portions between the inner peripheral surface of the outer column 25 and the outer peripheral surface of the front-side portion of the inner column 26 is reduced. In the unclamped state, the up-down position of the steering wheel 2 can be adjusted within a range in which the adjusting rod 21 can move inside the vehicle-body-side through holes 45a, 45b. In addition, adjustment of the front-rear position of the steering wheel 2 becomes possible within a range between a front-end position where the cushioning material 41 of the support bracket 34 supported by the inner column 26 comes in contact with the front-end edge 28a of the slit 28, and a rear-end position where the stopper member 35 abuts against the abutting surface 32a of the bulge portion 32.

After moving the steering wheel 2 to a desired position, the movable-side cam 50 is rotated in a locking direction by oscillating the adjusting lever 22, which widens the dimension in the width direction of the cam device 23, and reduces the distance between the fixed-side cam 51 and the thrust bearing 24. As a result, the force with which the pair of sandwiched plate portions 30b are sandwiched from both sides in the width direction by the pair of support plate portions 43a, 43b increases, and at the same time, the inner diameter of the outer column 25 is elastically contracted, and the surface pressure of the contact portions between the inner peripheral surface of the outer column 25 and the outer peripheral surface of the front-side portion of the inner column 26 increases. As a result, the steering wheel 2 is maintained at the adjusted position.

With the steering column device 4 of the present example, the movement in the width direction of the telescopic friction plate 53 with respect to the hook portion 42 is restricted.

That is, in the present example, the hook portion 42 having a cantilever beam structure is provided with the restricting projection 57 on the outer peripheral surface of the tip-end portion thereof for restricting the movement in the width direction of the telescopic friction plate 53 with respect to the hook portion 42. Therefore, even in a case where the cam device 23 is unclamped, and of the telescopic friction plates 53 arranged on the outermost side in the width direction, the telescopic friction plate 53 arranged on the one side in the width direction (the upper side in FIG. 11) has a curve such that the outer-side surface thereof becomes a concave surface, further movement of the telescopic friction plate 53 in the width direction with respect to the hook portion 42 is prevented by engaging the restricting projection 57 with the portion of the telescopic friction plate 53 located above the mounting hole 56. As a result, the hook margin of the telescopic friction plate 53 arranged on the one side in the width direction with respect to the hook portion 42 is prevented from becoming smaller. In the present example, the restricting projection 57 is respectively provided on both of the pair of hook portions 42 on both sides in the width direction, and thus the telescopic friction plate 53 arranged on the other side in the width direction is also restricted from moving in the width direction with respect to the hook portion 42.

In the present example, each restricting projection 57 is provided so as to project upward, which is a direction perpendicular to both the width direction and the front-rear direction long hole Therefore, when supporting the telescopic friction plate 53 by the hook portion 42 (assembling the telescopic friction plate 53 with the hook portion), instead of longitudinally tilting the front and rear sides of the telescopic friction plate 53 having large dimensions with regard to the width direction (for example, tilting the front-side portion so as to be positioned more inward in the width direction than the rear-side portion), assembly can be performed by tilting the top and bottom of the telescopic friction plate 53 having a short dimension with regard to the width direction (tilting the upper-side portion so as to be positioned further inward in the width direction than the lower-side portion), and thus workability in assembly can be improved.

In the present example, the restricting projection 57 is integrally provided on the outer peripheral surface of the tip-end of the hook portion 42, and the hook portion 42 is provided on the support bracket 34 that separates from the inner column 26 when a secondary collision occurs. Therefore, an increase in the number of parts of the steering column device 4 can be suppressed, and the size of the steering column device 4 can be made more compact. As a result, it is possible to improve the layout of the steering device to which the steering column device 4 is assembled.

In the present example, as illustrated in FIG. 11, in a free state, the plurality of telescopic friction plates 53 arranged on the one side in the width direction is in a curved state so that the outer-side surfaces thereof become concave surfaces, and the plurality of telescopic friction plates 53 arranged on the other side in the width direction is in a curved state so that the outer-side surfaces thereof become convex surfaces. For this reason, as a modification of the present example, of the pair of hook portions 42 provided on the support bracket 34, the restricting projection 57 can be provided only on the hook portion 42 arranged on the one side in the width direction, where the hook margin of the telescopic friction plate tends to be small. In addition, as another modification, the restricting projection can be provided on the lower-side surface of the tip-end of the hook portion so as to project downward.

Second Example

Figure 13:
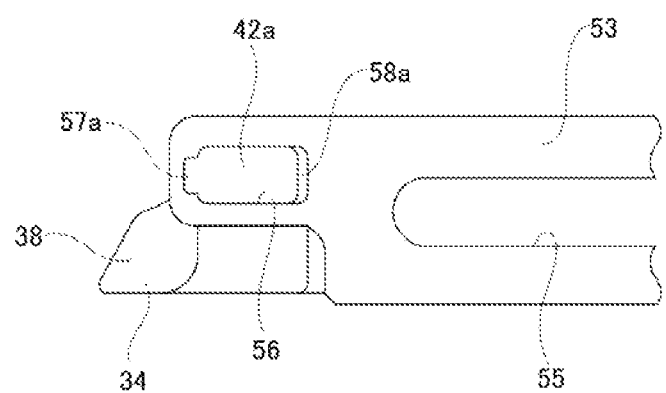
FIG. 13 is a diagram corresponding to FIG. 5, and illustrates a second example of an embodiment of the present invention.
Figure 14:
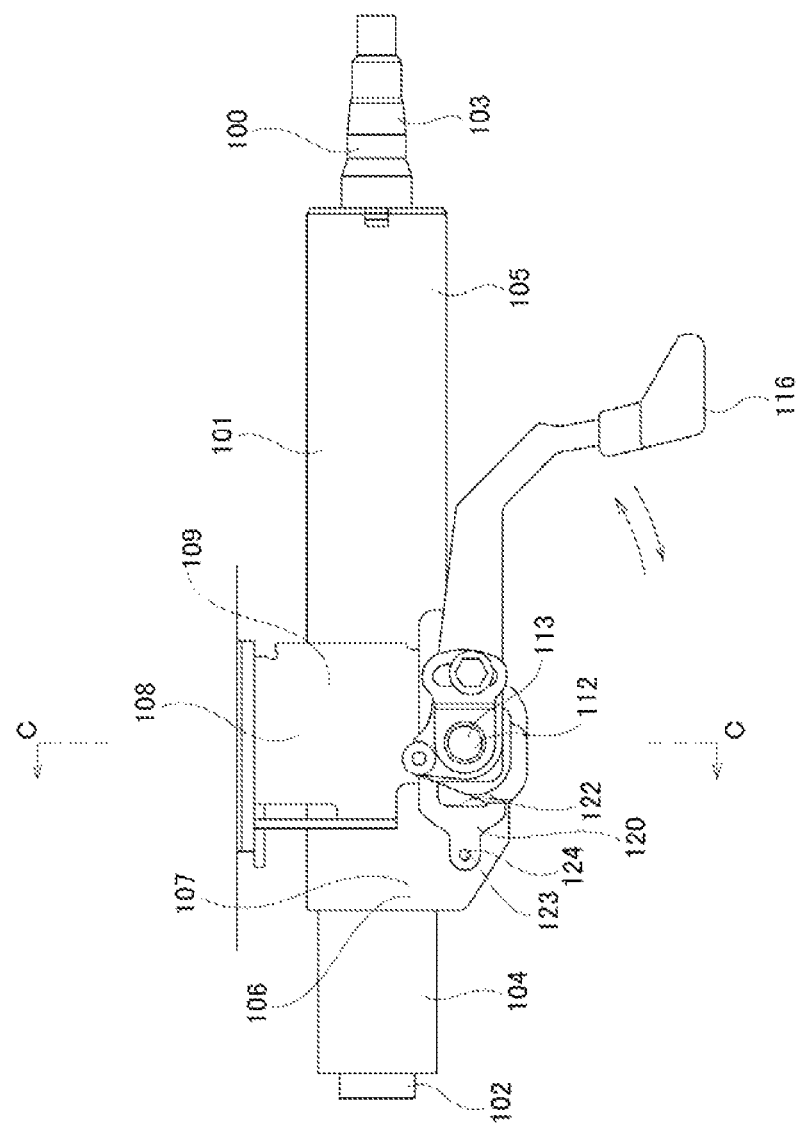
FIG. 14 is a side view illustrating an example of a steering column device having a conventional structure.
Figure 15:
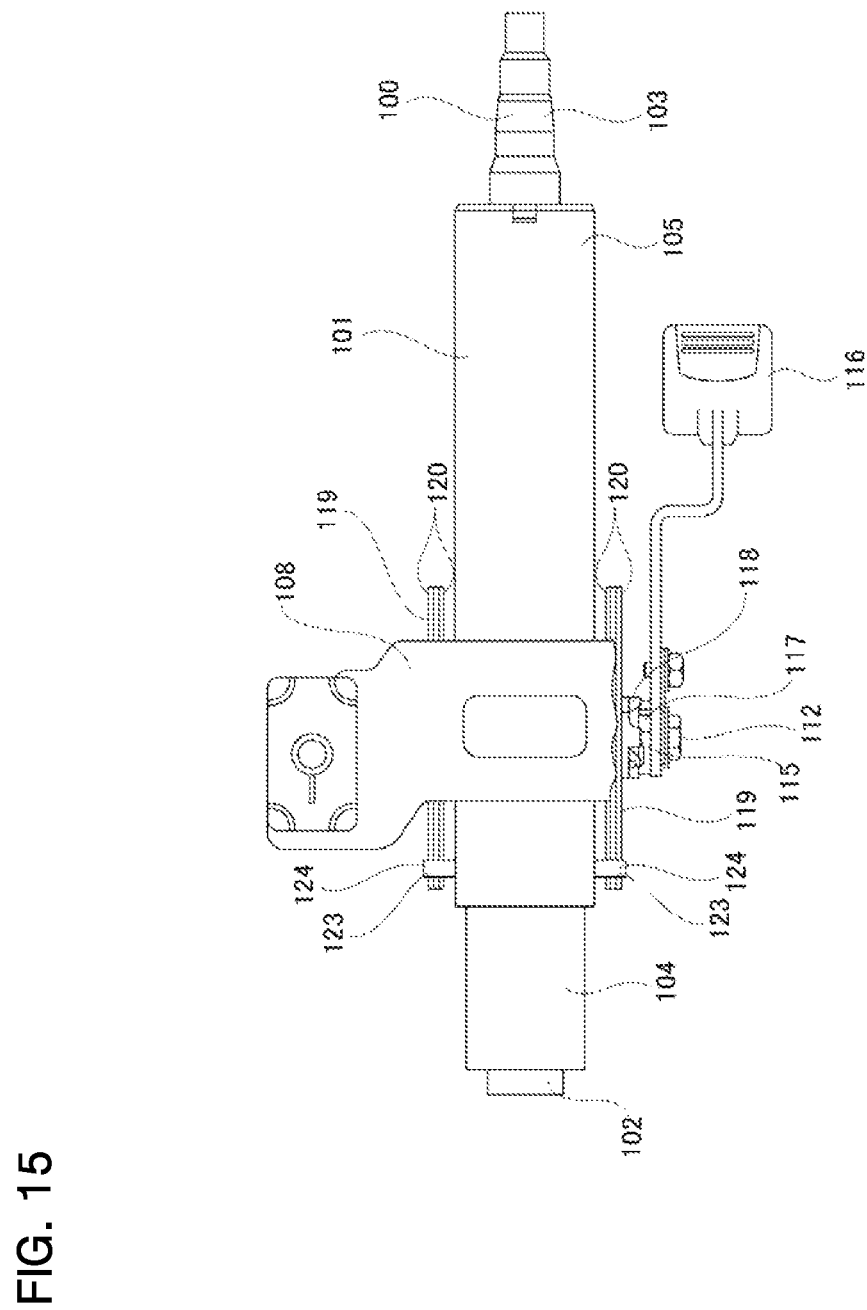
FIG. 15 is a plan view of the example of a steering column device having a conventional structure as viewed from the upper side in FIG. 14.
Figure 16:
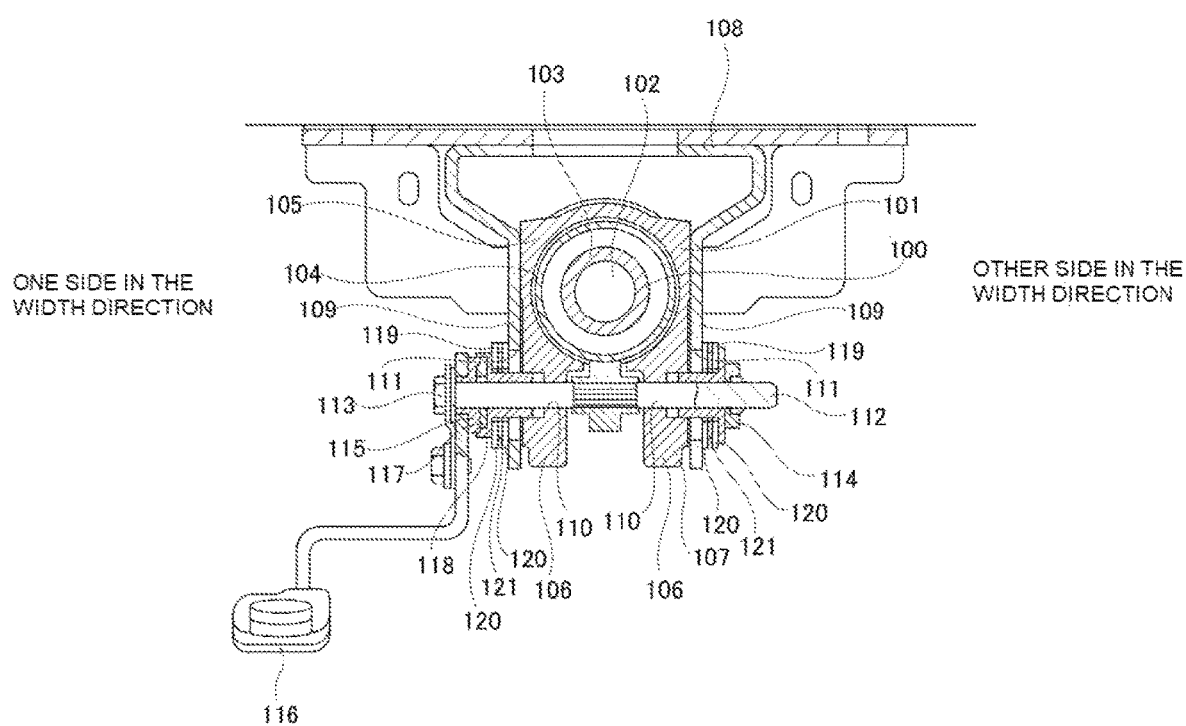
FIG. 16 is a cross-sectional view taken along the line C-C in FIG. 14.
Figure 17:
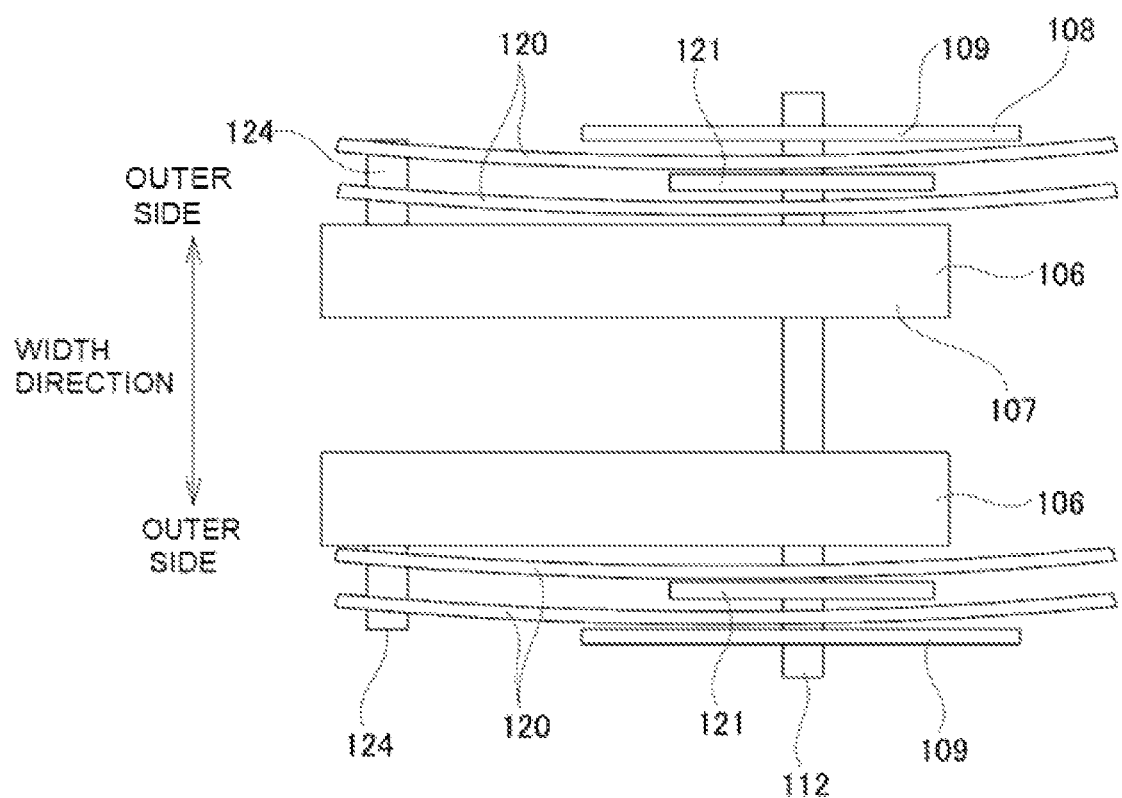
FIG. 17 is a schematic diagram as viewed from the bottom in FIG. 14 for explaining problems in an example of a steering column device having a conventional structure.

A second example of an embodiment of the present invention will be described with reference to FIG. 13.

In the present example, a restricting projection 57a is provided on the front-side surface of the tip-end portion of a hook portion 42a. The restricting projection 57a protrudes forward, which is the direction in which the front-rear direction long hole 55 extends. The restricting projection 57a is formed of a thin plate that is substantially rectangular as viewed in the width direction. The inner-side surface of the restricting projection 57a faces in the width direction a portion located on the front side of the mounting hole 56 on the outer-side surface of the telescopic friction plate 53 arranged on the outermost side in the width direction among the plurality of telescopic friction plates 53. The amount of projection of the restricting projection 57a is smaller than the dimension in front-to-rear direction of the portion of the telescopic friction plate 53 located on the front side of the mounting hole 56.

The hook portion 42a, on the tip-end surface, has an escape recess 58a that is recessed inward in the width direction on the rear-side portion opposite to the front-side portion where the restricting projection 57a is provided. The escape recess 58a prevents the rear-end edge of the mounting hole 56 of the telescopic friction plate 53 from coming into contact with the tip-end surface of the hook portion 42a when the telescopic friction plate 53 is assembled with the hook portion 42a.

In order to insert the hook portion 42a inside the mounting hole 56 of the telescopic friction plate 53, first, in a state in which the telescopic friction plate 53 is tilted so that the front-side portion is positioned further inward in the width direction than the rear-side portion, the front-edge portion of the mounting hole 56 is hooked onto (locked to) the restricting projection 57a of the hook portion 42a from the inner side in the width direction. Next, the hook portion 42a is inserted into the mounting hole 56 while rotating the telescopic friction plate 53 in a direction in which the inclination angle is decreased.

In the case of this example as well, the movement in the width direction of the telescopic friction plate 53 with respect to the hook portion 42a is restricted. Other configurations and effects of the second example are the same as those of the first example.

Embodiments of the present invention have been described above; however, the present invention is not limited to these embodiments and can be modified as appropriate without departing from the technical idea of the invention. In addition, the structures of the respective examples of the embodiments can be implemented in combination as appropriate as long as there is no contradiction.

In a case of implementing the present invention, the shape, formation position, formation range, and the like of the restricting projection are not limited to the structures shown in the respective examples of the embodiments, and may be changed as appropriate as long as the function of restricting movement in the width direction of the friction plate can be exhibited. In addition, the shape of the hook portion is not limited to the structures in the examples of the embodiments, and a shape other than a square column shape (rectangular column shape) such as a cylindrical column shape can be adopted. Moreover, a long hole provided in the friction plate and extending in a direction in which the position of the steering wheel should be adjustable (for example, a long hole in the front-rear direction, a long hole in the up-down direction) is not limited to a slit-shaped long hole as in each of the examples of the embodiments, and may also be configured by a long hole with a closed circumference. Furthermore, the steering column device of the present invention may be applied not only to restriction of movement in the width direction of telescopic friction plates but also to tilt friction plates.

REFERENCE SIGNS LIST

1 Electric power steering device
2 Steering wheel
3 Steering shaft
4 Steering column device
5a, 5b Universal joint
6 Intermediate shaft
7 Steering gear unit
8 Tie rod
9 Electric power assist device
10 Gear housing
11 Torsion bar
12 Output shaft
13 Pinion shaft
14 Torque sensor
15 Electric motor
16 Worm speed reducer
17 Inner shaft
18 Outer shaft
19 Steering column
20 Vehicle-body-side bracket
21 Adjusting rod
22 Adjusting lever
23 Cam device
24 Thrust bearing
25 Outer column
26 Inner column
27 Rolling bearing
28 Slit
   28a Front-end edge
29 Column-side bracket
30a, 30b Sandwiched plate portion
31a, 31b Column-side through hole
32 Bulge portion
   32a Abutting surface
33 Accommodating space
34 Support bracket
35 Stopper member
36 Mounting portion
   36a Through hole 37 Connecting portion
38 Body portion
39 Shear pin
40 Locking recess portion
41 Cushioning material
42, 42a Hook portion
43a, 43b Support plate portion
44 Top plate portion
45b Vehicle-body-side through hole
46 Through hole
47 Anchor portion
48 Male threaded portion
49 Nut
50 Movable-side cam
51 Fixed-side cam
52 Friction unit
53 Telescopic friction plate
54 Fixed-side friction plate
55 Front-rear direction long hole
56 Mounting hole
57, 57a Restricting projection
58 Escape recess
59 Circular hole
60 Connecting portion
100 Steering shaft
101 Steering column
102 Inner shaft
103 Outer shaft
104 Inner column
105 Outer column
106 Sandwiched plate portion
107 Column-side bracket
108 Vehicle-body-side bracket
109 Support plate portion
110 Column-side through hole
111 Vehicle-body-side through hole
112 Adjusting rod
113 Anchor portion
114 Retaining member
115 Cam device
116 Adjusting lever
117 Movable-side cam
118 Fixed-side cam
119 Friction unit
120 Telescopic friction plate
121 Washer
122 Front-rear direction long hole
123 Mounting hole
124 Hook portion

The invention claimed is:

1. A steering column device, comprising:
a steering column including a column-side bracket having a column-side through hole penetrating in a width direction;
a vehicle-body-side bracket including a pair of support plate portions arranged on both sides in the width direction of the column side bracket, each having a vehicle-body-side through hole penetrating in the width direction;
an adjusting rod inserted in the width direction through the column-side through-hole and the pair of vehicle-body-side through-holes;
a pair of pressing portions provided at portions of the adjusting rod protruding in the width direction from outer-side surfaces of the pair of support plate portions;
an expansion/contraction mechanism configured to expand or contract a distance between the pair of pressing portions;
a friction plate having a long hole extending in a direction in which a position of a steering wheel should be adjustable and through which the adjusting rod is inserted, and a mounting hole, and sandwiched at least one of a portion between one of inner-side surfaces of the pair of support plate portions and an outer-side surface of the column-side bracket, and a portion between one of outer-side surfaces of the pair of support plate portions and one of inner-side surfaces of the pair of pressing portions; and
a hook portion having a cantilever beam structure and inserted in the width direction through the mounting hole;
the hook portion having a restricting projection for restricting movement in the width direction of the friction plate.

2. The steering column device according to claim 1, wherein
the restricting projection projects in a direction perpendicular to the width direction and a lengthwise direction of the long hole.

3. The steering column device according to claim 1, wherein
the restricting projection is provided integrally with the hook portion on an outer peripheral surface of an end portion of the hook portion.

4. The steering column device according to claim 1, wherein
the hook portion is inserted through the mounting hole with relative rotation therebetween being substantially not possible.

5. The steering column device according to claim 1, wherein
the friction plate is curved with an outer-side surface thereof being a concave surface in a free state.

6. The steering column device according to claim 1, wherein
the steering column has an outer column arranged on a front side, an inner column arranged on a rear side, and a support bracket;
the outer column includes a slit extending in an axial direction, and a pair of sandwiched plate portions constituting the column-side bracket, the pair of sandwiched plate portions arranged on both sides of the slit in the width direction and provided with the column-side through holes;
the support bracket includes a mounting portion arranged inside the slit and detachably attached to the inner column, and the hook portion; and
the long hole is a front-rear direction long hole extending in the front-rear direction.

7. The steering column device according to claim 6, wherein
the friction plate is provided such that one or more friction plates respectively sandwiched between the inner-side surfaces of the pair of support plate portions and outer-side surfaces of the pair of sandwiched plate portions;
the hook portion is configured by two hook portions; and
the restricting projection is provided in at least one hook portion of the two hook portions.

8. The steering column device according to claim 7, wherein the restricting projection is provided in the two hook portions.

* * * * *